United States Patent Office 3,453,515
Patented July 1, 1969

3,453,515
VARIABLE FREQUENCY POLYPHASE CURRENT GENERATOR FOR CONTROLLING THE SPEED OF AN ELECTRIC MOTOR
Robert Millois, Auffargis, and Jean Peiffert and Georges Stcherbatcheff, Paris, France, assignors to Oxymill S.A., a limited company
Filed Sept. 26, 1966, Ser. No. 581,865
Claims priority, application France, Sept. 30, 1965, 33,234
Int. Cl. H02p 7/36
U.S. Cl. 318—207　　　　　　　　　　　　　　4 Claims

ABSTRACT OF THE DISCLOSURE

The invention broadly relates to the control of electric motors. It provides a variable frequency polyphase current generator whereby the speed of the controlled motor is capable of undergoing a fully progressive variation about the zero value. Said generator includes means for generating pulse trains having a variable repetition frequency and predetermined phase-shifts with respect to each other and means for sampling a periodic signal under the control of said pulse trains, so as to restore the waveform of the said periodic signal while changing the frequency thereof.

---

This invention relates to the control of motors such as synchronous motors and polarized stepping motors.

In certain applications of these motors, especially in servo-control systems, it proves necessary to generate a variable-frequency polyphase current such that the speed of the motor which is controlled by this current is capable of undergoing a fully progressive variation about the zero value.

This result is not achieved by means of conventional electronic control circuits. In fact, such circuits make use of a switching system for reversing the direction of motion, which results in discontinuity in the vicinity of the stationary position.

It is an object of the present invention to provide a device for generating variable-frequency polyphase current which is not subject to the disadvantage referred-to.

It is another object of this invention to provide a variable-frequency polyphase current generator comprising means for generating a plurality of recurrent-pulse trains having a recurrence frequency which varies from a fixed reference value, the respective pulse trains having respective predetermined phase-shifts with respect to each other, a plurality of gating means each having first and second inputs and an output, the respective first inputs of the gating means being connected to the respective outputs of the generators, a further generator having an output connected to the second inputs of the gating means and providing a periodic signal having said reference frequency and a predetermined waveform, a plurality of memory units, respectively connected at the outputs of the gating means, said memory units each having an output, the gating means and the memory units being arranged for collecting, during the delivery of the respective pulses of said pulse trains, samples of said periodic signal and for storing each of said samples until a next sample is produced in the same gating means, whereby the said waveform is reconstituted on each output of the memory units, and means, connected at the outputs of the memory units, for amplifying the reconstituted waveforms.

These and other objects of the present invention will become readily apparent from the following description and from the accompanying drawings.

Figure 1:
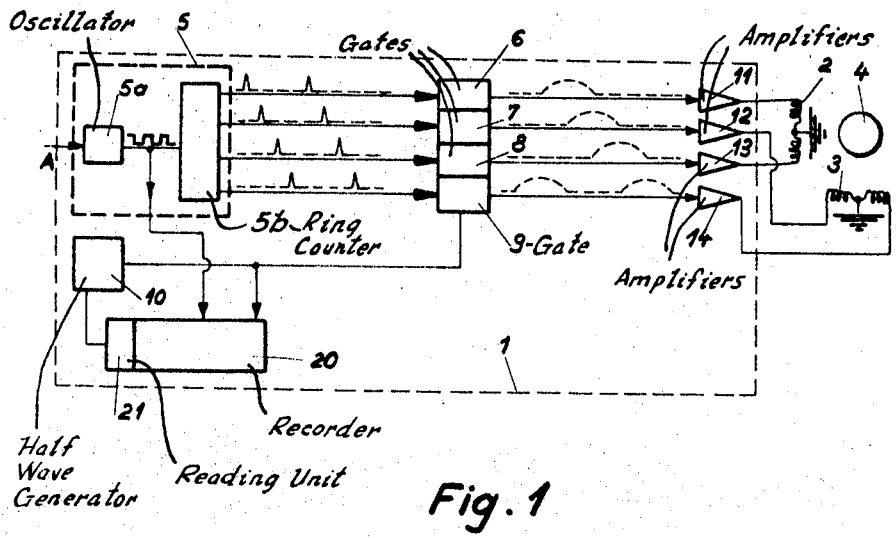
FIG. 1 is a general arrangement diagram of a phase-shifted sinewave current generator in accordance with the invention.

In FIG. 1, there is shown a device 1 which is intended to supply to the field windings 2–3 of a synchronous motor 2–3–4 a phase-shifted sinewave current of variable frequency.

As will become apparent hereinafter, the current supplied by a device of this type is suitable for controlling the operation of the motor at variable speed and for reversing the direction of rotation through the stationary position without any discontinuity.

The device 1 comprises a pulse generator 5 having four outputs coupled respectively to the inputs of four gates 6 to 9 which are in turn controlled by a device 10 for generating a half sinewave at the fixed frequency F.

The outputs of the gates 6 to 9 are respectively connected to the inputs of four amplifiers 11 to 14. The outputs of the amplifiers 11 and 13 are connected to the respective extremities of the winding 2 whilst the outputs of the amplifiers 12 and 14 are connected to the respective extremities of the winding 3. The windings 2 and 3 are connected to ground (earth) at the mid-point thereof.

The generator 5 supplies four pulse trains which are shown in broken lines in the figure above the respective lead-out wires.

The pulse train which is collected from each output is phase-shifted by one-quarter of a cycle with respect to the pulse train supplied from an adjacent output.

The recurrence frequency of the pulses of each train is $F+f$, $f$ being variable and relatively small with respect to F.

The construction of the generator 5 consisting of an oscillator 5a having a frequency $4(F+f)$ followed by electronic trigger circuits and pulse-shaping circuits 5b is within the capacity of the skilled man and will therefore not be described in detail.

As a non-limiting example, the unit 5b may disclose a ring counter such as that disclosed in "Waveforms," McGraw-Hill editions, 1949, pp. 602–603. Such a ring counter, composed of four identical bi-stable units on which the pulses from oscillator 5a will be simultaneously applied, will provide, at the respective output of the bi-stable units, four pulse trains at the variable frequency $F+f$ (which is one quarter of the frequency of the oscillator 5a), the said pulse trains being phase-shifted by one-quarter of a period with respect to each other.

The variation of $f$ is obtained in known manner by providing the oscillator 5a with a frequency control device such as a potentiometer which can either be operated by hand or by means of an external signal which is applied to the terminal A.

Each of the gates 6 to 9 is opened by the pulses having a frequency $F+f$ which are applied thereto and transmits the waveform having a frequency F as derived from the device 10 during the time of delivery of said pulses as will be explained hereinafter with reference to FIG. 1.

It can be demonstrated that, under these conditions, the sample signals $E_1$, $E_2$, $E_3$, etc., which are taken from the half-wave of $F_1$, $F_2$, $F_3$, etc. by the pulses $I_1$, $I_2$, $I_3$, etc., have as envelope E a half sinewave which is evidently equal in frequency to the difference $(F+f)-F$, that is to say to $f$.

As will be explained hereinafter with reference to FIG. 1, the gates 6 to 9 each comprise at the output thereof a sample storage unit which only transmits said envelope.

Figure 2:
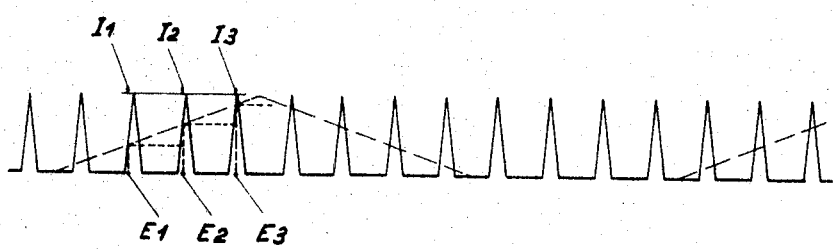
FIG. 2 is intended to enable a clear understanding to be gained of the frequency-change system which is provided in a generator of this type.

It is readily apparent that this method of changing the frequency of the initial wave I, which is already known per se, restores the waveform thereof even in the case in which this latter is not a half sinewave. The invention is therefore not limited in any sense to this case which is given solely by way of illustrative example and, in order that could more easily be drafted FIG. 2, the case of a triangular waveform has been chosen.

Accordingly, the waveforms are as shown in the drawing, namely above the lead-out wires from the gates 6 to 9. It is apparent that the two half-waves which are phase-shifted by one half-cycle relatively to each other and appear at the outputs of the amplifiers 11 and 13 are applied to the symmetrical winding 2 in such a manner that said half-waves finally reconstitute a full sinewave at the terminals of said winding.

Similarly, the output voltages of the amplifiers 12 and 14 reconstitute at the terminals of the winding 3 a second full sinewave which is retarded in phase by one-quarter of a cycle with respect to the first sinewave. The motor is therefore effectively supplied in quadrature as its operation requires.

It will be understood that, by providing the pulse generator 5 with $n$ pairs of outputs which are suitably phase-shifted, it would be possible to produce in the same manner a polyphase supply having $n$ phases of variable frequency.

It can readily be shown that, if the device 5 generates pulses at the frequency $F-f$, the apparatus finally generates in the example herein described two sinewaves in quadrature but with advance of phase of the sinewave which is applied to the winding 3 with respect to the sinewave which is applied to the winding 2. The result thereby achieved is that the direction of rotation of the motor is reversed when the frequency of the pulses produced by the generator 5 changes over from a value higher than F to a value lower than F and conversely.

It can be demonstrated that this reversing of the direction of rotation takes place by passing through the stationary position without any discontinuity, and this constitutes a very important advantage of the invention.

To this end, it is merely necessary to ensure that the amplifiers transmit the direct current which is accordingly transmitted by the gates 6 to 9, with the result that the motor is maintained stationary in a well-determined position.

In other words, when $f$ decreases with a tendency towards zero, the motor slows down to a standstill and can then resume operation with equal ease either in one direction or in the other when $f$ is again varied.

As will be readily understood, it will be an advantage in practice to choose a half-sinusoidal waveform as has been assumed in the foregoing description. In this case, the amplifiers 11 to 14 could operate in class B and could readily supply the requisite power, this constituting a substantial advantage of this preferred form of embodiment of the invention.

Figure 3:
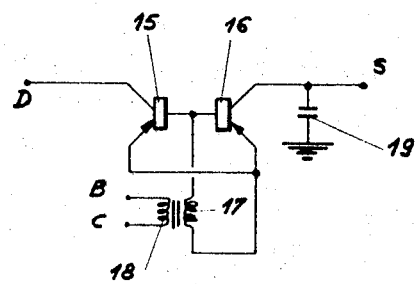
FIG. 3 shows the system which carries out said frequency change.

Referring to FIG. 3, there will now be described a preferred form of embodiment of one of the circuits 6 to 9 adapted for collecting and storing sample signals, as hereinabove designated by the name of "gate."

A gate of this type is composed of two transistors 15 and 16, the two respective bases of which have a common point connected to one end of the secondary winding 17 of a transformer, the primary winding 18 of which has two terminals B and C between which the drive pulses $I_1$, $I_2$, etc. are applied.

The emitters of the two transistors have a common point which is connected to the other end of the winding 17.

The collector of the transistor 15 is connected to a terminal D to which is applied the waveform to be sampled (i.e., the output of device 10, (FIG. 1).

A capacitor 19 is connected in parallel across the collector of the transistor 16.

The envelope E is collected at the output S of the circuit (which is connected to one of the amplifiers 11–14, FIG. 1).

The operation of the circuit is as follows:

The two transistors are switching transistors and consequently transmit the waveform which is applied at D only during delivery of the pulses applied between B and C.

The capacitor 19, which plays the part of the sample storage unit as referred to hereinabove, is charged by each of the successive samples $E_1$, $E_2$, etc. The capacitor charge remains substantially constant between two samples, with the result that the voltage at S has a step shape which constitutes a sufficient approximation of the waveform to be transmitted.

As will be apparent, alternative forms could be devised for a circuit of this type without thereby departing from the scope of this invention.

It is of interest to note one advantageous property of the device for controlling the speed of a motor as hereinabove described.

This property consists in the fact that the sequence of movements of the motor is fully determined by the signals of the oscillators 5a and 10.

It is known that, in certain servo-control systems, a synchronous motor is employed for the purpose of carrying out a sequence of movements according to a predetermined law. The servo-control system usually comprises means for generating a signal which is proportional to the difference between the actual instantaneous position of the motor and its predetermined position, and it is this error signal as applied to the terminal A of the apparatus of FIG. 1 which controls the movement of the motor with a view to cancelling the error signal which results in stopping of the motor.

In consequence, a well determined sequence of movements of the motor corresponds to a certain program of evolution of the variable.

FIG. 1 shows a recording device 20, for example of the magnetic tape type in which there can be stored both the control signals having a multiple frequency $(F+f)$ and the reference signal having a frequency F which correspond to the sequence of movements referred-to above.

When the servo-control system has preformed the program once, said system can then be put out of operation and initiate the reproduction of the program as many times as may be desired by means of control signals which are read on the recording unit by means of a suitable reader 21.

The above-mentioned signals serve to synchronize the different generators having frequencies F and $F+f$ as indicated in the drawings.

What is claimed is:

1. A variable-frequency polyphase current generator comprising means for generating on a plurality of outputs, a corresponding plurality of recurrent-pulse trains having a recurrence frequency which varies from a fixed reference value, the respective pulse trains having respective predetermined phase-shifts with respect to each other, a plurality of gating means each having first and second inputs and an output, the respective first inputs of the gating means being connected to the respective outputs of the generator; a further generator having an output connected to the second inputs of the gating means and providing a periodic signal having said reference frequency and a predetermined waveform, a plurality of memory units, respectively connected at the outputs of the gating means, said memory units each having an output, the gating means and the memory units being arranged for collecting, during the delivery of the respective pulses of said pulse trains, samples of said periodic signal and for storing each of said samples until a next sample is produced in the same gating means, whereby the said waveform is reconstituted on each output of the memory units, and means connected at the outputs of the memory units, for amplifying the reconstituted waveforms.

2. A variable-frequency polyphase current generator in accordance with claim 1, wherein said gating means each include first and second transistors each having an emitter, a collector and a base, and circuit means connecting the bases and emitters of said first and second transistors to said second input, the collector of the first transistor to said first input and the collector of the second transistor to the output of the gating means.

3. A variable-frequency polyphase current generator in accordance with claim 1, wherein each of said memory unit includes a capacitor connected at the output of the said gating means.

4. A variable-frequency polyphase current generator in accordance with claim 1, said generator further including recording means connected to the outputs of said generating means and of said further generator, and reading means cooperating with said recording means, said reading means being connected to the outputs of said generating means and of said further generator.

References Cited

UNITED STATES PATENTS

| | | | |
|---|---|---|---|
| 2,788,476 | 4/1957 | Shaw | 318—20.350 |
| 2,935,660 | 5/1960 | Patchell | 318—207.56 |
| 3,150,303 | 9/1964 | James et al. | 318—207 XR |
| 3,171,073 | 2/1965 | Adams | 318—207 |
| 3,308,307 | 3/1967 | Moritz | 318—341 XR |
| 3,331,006 | 7/1967 | Strand et al. | 318—341 XR |

ORIS L. RADER, *Primary Examiner.*

G. Z. RUBINSON, *Assistant Examiner.*

U.S. Cl. X.R.

318—18, 341